(12) United States Patent
Quan, Jr. et al.

(10) Patent No.: US 8,015,555 B2
(45) Date of Patent: Sep. 6, 2011

(54) AUTOMATON LOOP CONSTRUCT (ALC) AND METHOD OF PERFORMING PROGRAM OPTIMIZATION USING THE ALC

(75) Inventors: Dennis A. Quan, Jr., Quincy, MA (US); Moshe Morris Emanuel Matsa, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1430 days.

(21) Appl. No.: 11/500,583

(22) Filed: Aug. 7, 2006

(65) Prior Publication Data
US 2008/0034358 A1    Feb. 7, 2008

(51) Int. Cl.
*G06F 9/45*    (2006.01)

(52) U.S. Cl. .................................................. 717/151

(58) Field of Classification Search .................. 717/151
See application file for complete search history.

(56) References Cited

U.S. PATENT DOCUMENTS

| | | | |
|---|---|---|---|
| 2003/0097652 A1* | 5/2003 | Roediger et al. | 717/160 |
| 2003/0200539 A1* | 10/2003 | Fu et al. | 717/161 |
| 2006/0080645 A1* | 4/2006 | Miranda et al. | 717/137 |

* cited by examiner

*Primary Examiner* — John Chavis
(74) *Attorney, Agent, or Firm* — Chapin IP Law, LLC; Barry W. Chapin, Esq.

(57) ABSTRACT

A method, apparatus and computer program product for performing program optimization using Automaton Loop Construct (ALC) is presented. At least one ALC is defined and a program is constructed utilizing the at least one ALC. The program is optimized, the optimizing including pre-computing as much output as possible using the at least one ALC, the optimizing resulting in optimized program code.

17 Claims, 3 Drawing Sheets

AUTOMATON LOOP CONSTRUCT (ALC) AND METHOD OF PERFORMING PROGRAM OPTIMIZATION USING THE ALC

BACKGROUND

There are a large number of components involved in modern enterprise applications. This large number of components require many traversals of the data set for the data to flow from one component to the next—on the order of a constant times n traversals for n components—and this time often dominates over the time spent on the actual business logic of the application in terms of time spent by the CPU. Most enterprise application environments do nothing to eliminate unnecessary traversals, because for such a system to consolidate traversals today, components, which are usually written in procedural languages, must be recoded to be aware of one another, reducing the reusability of these components. The only way to keep the benefits of componentization and remove the drawbacks of the many recodings of the data, would be to pass the components to a compiler and then compile the recodings away—this process is known as deforestation. We know of no system today that has a generic mechanism for eliminating redundant and unneeded traversals.

A large class of real-world enterprise business applications are written in components which require reformulating all of the data that flows through them a number of times. Each time requires time to do the reformulation as well as memory to store the reformulated data.

Deforestation is the process of program optimization to remove intermediate trees. Finite state automata have long been knows as a general purpose computing construct, well-known by computer scientists, and easy to understand. Also known are ways to turn general functions into finite state automata, and then collapse any sequence of successive finite state automata into a single automata, which accomplishes some more deforesting.

Extensible Markup Language (XML) processing is one field where there is low performance resulting from many disparate components, and the many resulting data recodings. XML has begun to work its way into the business computing infrastructure and underlying protocols such as the Simple Object Access Protocol (SOAP) and Web services. In the performance-critical setting of business computing, however, the flexibility of XML becomes a liability due to the potentially significant performance penalty. XML processing is conceptually a multitiered task, an attribute it inherits from the multiple layers of specifications that govern its use including: XML, XML namespaces, XML Information Set (Infoset), and XML Schema, followed by transformation (XSLT), query (XQuery), etc. Traditional XML processor implementations reflect these specification layers directly. Bytes are converted to some known form. Attribute values and end-of-line sequences are normalized. Namespace declarations and prefixes are resolved, and the tokens are then transformed into some representation of the document Infoset. The Infoset is optionally checked against an XML Schema grammar (XML schema, schema) for validity and rendered to the user through some interface, such as Simple API for XML (SAX) or Document Object Model (DOM) (API stands for application programming interface). Finally, higher-level processing is done, such as transformation, query, or other Web Services processing.

With the widespread adoption of SOAP and Web services, XML-based processing, and parsing of XML documents in particular, is becoming a performance-critical aspect of business computing. In such scenarios, XML is usually being processed by languages such as XSLT and XQuery, etc. In total, this leaves processing at many independent levels: XML parsing, validation, deserialization, transformation, query, etc. This division into separate layers of processing fits well with current software engineering practices which encourage reusable pieces of code to be packaged into components. To create a complete application, a number of components—often written by different authors or under different circumstances—must be assembled. Enterprise applications typically process data in high volumes, and as such, large quantities of data pass through the components that make up the application. Most components, as part of their normal function, will have to make at least one traversal through this data. In addition, because of the diversity of their origin, each component often requires data to be packaged in a very specific form, and a considerable amount of time is also spent traversing the data set to convert it from one form to another as it is sent through the various components.

SUMMARY

Conventional mechanisms such as those explained above suffer from a variety of deficiencies. One of the mechanisms was to turn general functions into finite state automata and combine them. One deficiency for this mechanism is that this approach does not lend itself to removing much of the work involved, just the intermediate data structures. Furthermore, while removing the intermediate data structures, it does not remove the need for the parts of the initial data structure which might not be needed, and it does not pre-compute the parts of the output data structure that can be known at compile time. Thus, deforestation of generic automata leaves a lot of extra computation in the runtime program. Thus, separate components and many recodings of data are a current problem for many modern enterprise applications, including XML processing.

Embodiments of the invention significantly overcome such deficiencies and provide mechanisms and techniques that provide an Automaton Loop Construct (ALC) and method of performing program optimization using the ALC.

The present invention utilizes an optimization framework which can remove many unnecessary data recoding steps, thus improving performance and decreasing memory usage. The key benefit of the automaton deforestation technique is that the program made up of all of the components is optimizable, and a novel compiler can take advantage of that through deforestation and partial deforestation to precompute as much of the output as possible at compile time, and remove as many extra forms of the data as possible.

In a particular embodiment the ALC comprises an initial state for the ALC to start in and a plurality of transitions, each transition including: a state number, a pattern against which to match a potential source object, a target state number, and a sequence of output objects.

In a particular embodiment of a method of performing program optimization using Automaton Loop Construct (ALC), the method includes defining at least one ALC and constructing a program utilizing the at least one ALC. The method further comprises optimizing the program, the optimizing including pre-computing as much output as possible using said at least one ALC, the optimizing resulting in optimized program code.

Other embodiments include a computer readable medium having computer readable code thereon for performing program optimization using Automaton Loop Construct (ALC). The medium includes instructions for defining at least one ALC and instructions for constructing a program utilizing the at least one ALC. The computer readable medium further includes instructions for optimizing the program, the optimizing including pre-computing as much output as possible using said at least one ALC, the optimizing resulting in optimized program code.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process for performing program optimization using Automaton Loop Construct (ALC) as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for performing program optimization using Automaton Loop Construct (ALC) as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
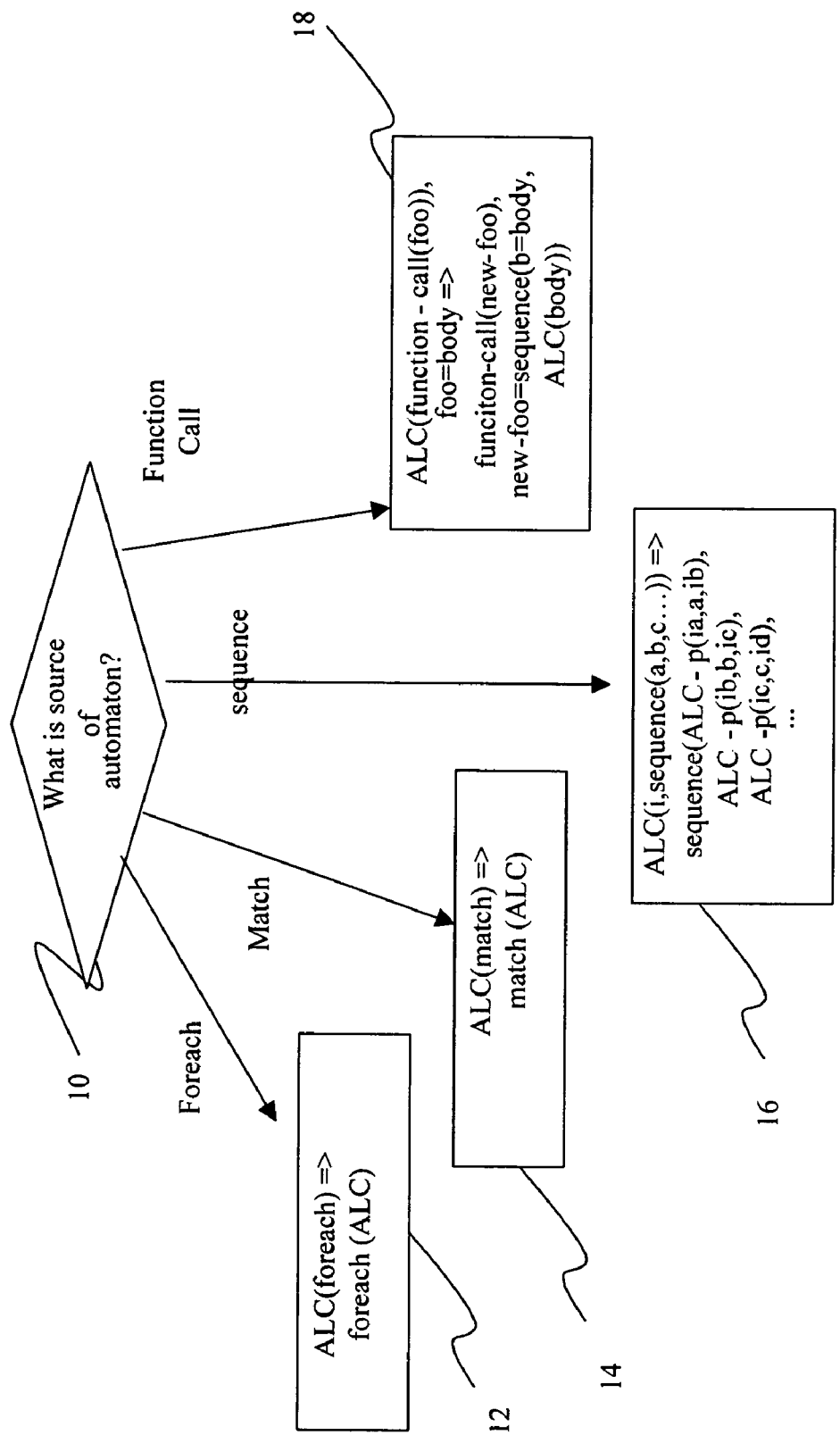
FIG. 1 comprises a diagram of optimizing an ALC in accordance with embodiment of the present invention.

The present method and apparatus performing program optimization using Automaton Loop Construct (ALC) defines a ALC and further includes rewriting key parts of enterprise business applications using finite state automata, and includes ways to use the knowledge contained in these to have a compiler remove the extra reformulations of the data.

Presented is a new automaton loop construct, and a way to partially deforest a program with it, which can be used to solve the problem. This construct is simple, functional, easy to deforest against and partially deforest against, and is also quite familiar and intuitive to computer scientists. While this construct can be generally straightforward for computer scientists to reason about and write, and for a compiler to partially evaluate, deforest, and partially deforest, for a wide range of problems, the ALC will be explained in reference to the particular problem of XML serialization as part of an XML processing scenario. Note that the present invention is not intended to be limited to an XML serialzier, the XML serializer example is used for explanation purposes.

Functional XML processing code can be written around an ALC which can be optimized using classical functional language techniques, in order to precompute more of the output of XML processing, such as transformation, query, etc. Since this construct is a well-understood abstraction, it can be easy to use for computer scientists, and the increased optimizability can bring substantial speedups to this performance-critical arena.

Computer scientists are quite familiar with the finite state automaton. The present "Automaton Loop Construct" (ALC) is basically a finite state automaton tailored to be easily deforestable and partially deforestable. The ALC works as follows:

1. The automaton starts in an initial state.
2. A sequence of objects is consumed one at a time.
3. A consumed object is matched to the first possible state transition given the current state. The state transition consists of four parts: (1) a state number, (2) a pattern against which to match a potential source object, (3) a target state, and (4) a sequence of output objects. The automaton outputs the output object sequence associated with the state transition and changes to the associated target state. Steps 2-3 are repeated until all objects are consumed from the input.

Automatons are very well suited for use in deforestation optimizations. One of the important things about our limited automata is that all transitions are on a known constant state, so that a compiler can make deductions using this information. Consider the following example of a simplified XML serializer:

```
XML_Event =
   Begin_Tag(name)       | /* Output an XML tag <foo> */
   End_Tag(name)    | /* Output a closing XML tag </foo> */
   Add_Attribute(name, value)      | /* Output an attribute
   pair bar="baz" */
   Add_Text(text)         /* Output text */
automaton Initial State 1
   State 1, Begin_Tag(name) ->      State 2, "<" & name & " "
   State 2, Begin_Tag(name) ->      State 2, "><" & name & " "
```

-continued

```
State 1, End_Tag(name) ->        State 1, "</" & name & ">"
State 2, End_Tag(name) ->        State 1, "></" & name & ">"
State 2, Add_Attribute(name, value) ->   State 2, name &
"=\"" & value & "\" "
State 1, Add_Text(text) ->       State 1, text
State 2, Add_Text(text) ->       State 1, ">" & text
```

The automaton has two states—state 2 indicates that the closing ">" on a start tag has not been yet outputted, and state 1 indicates that the closing ">" on the last start tag (if any) has already been outputted.

To produce this fragment: <foo bar="baz">fluff</foo>, the following subroutine could be used:

```
Subroutine Output_Foo:
Begin_Tag("foo")
Add_Attribute("bar", "baz")
Add_Text("fluff")
End_Tag("foo")
```

The advantage of the automaton representation of the ALC arises when used with partial evaluation and deforestation. For example, suppose the Output_Foo subroutine is called in the middle of a program in which XML is outputted. At any given invocation of Output_Foo, it is unknown whether the XML serializer is in state 1 or 2. However, regardless of whether the serializer is in state 1 or 2 at the beginning of the invocation of Output_Foo, after the first Begin_Tag event is processed, the serializer will deterministically be in state 2. The important part is that the compiler can determine this statically with relative ease by simply looking at the definition of the automaton. Therefore, at runtime, instead of requiring a switch to be executed before every event which is processed by the automaton, only the first event requires an if statement; the rest of the event stream, from the Add_Attribute("bar", "baz") portion on, can be partially evaluated, or precomputed, at compile time. For example, code for the sample subroutine can always be generated as:

```
if (state == 1) {
  output "<foo "
} else {
  output "><foo "
}
output "bar="baz">fluff</foo>"
state = 1;
```

Building up a more complicated case, consider the following subroutine:

```
Subroutine Second_Level:
Begin_Tag("one")
Begin_Tag("blue")
End_Tag("blue")
Begin_Tag("red")
End_Tag("red")
End_Tag("one")
Call-Subroutine Unknown
Begin_Tag("two")
Add_Attribute("a", "2")
Call-Subroutine Output_Foo
Call-Subroutine Output_Foo
End_Tag("two")
```

Using the kind of compilation discussed above, the compiler can generate code like the following for this subroutine:

```
Second_Level:
if (state == 1) {
  output "<one "
} else {
  output "><one "
}
output "><blue></blue><red></red></one>"
state = (call Unknown state=1)
if (state == 1) {
  output "<two "
} else {
  output "><two "
}
output "a="2""
state = (call Output_Foo state=2)
state = (call Output_Foo state=state)
if (state == 1) {
  output "</two>"
} else {
  output "></two>"
}
state = 1;
```

Since Output_Foo, as seen above, always leaves in state 1, this code can be optimized as follows:

```
Second_Level:
if (state == 1) {
  output "<one "
} else {
  output "><one "
}
output "><blue></blue><red></red></one>"
state = (call Unknown state=1)
if (state == 1) {
  output "<two "
} else {
  output "><two "
}
output "a="2""
call Output_Foo state=2
call Output_Foo state=1
output "</two>"
state = 1;
```

By specializing the Output_Foo code to the specific values of the initial state, the results are:

```
Output_Foo_Initial_State_1:
output "<foo bar="baz">fluff</foo>"
state = 1;
Output_Foo_Initial_State_2:
output "><foo bar="baz">fluff</foo>"
state = 1;
Second_Level:
if (state == 1) {
  output "<one "
} else {
  output "><one "
}
output "><blue></blue></red></red></one>"
state = (call Unknown state=1)
if (state == 1) {
  output "<two "
} else {
  output "><two "
}
output "a="2""
call Output_Foo_Initial_State_2
```

-continued

```
    call Output_Foo_Initial_State_1
    output "</two>"
    state = 1;
```

If appropriate, the two called subroutines can then be inlined, producing the following code:

```
Second_Level:
if (state == 1) {
    output "<one "
} else {
    output "><one "
}
output "><blue></blue><red></red></one>"
state = (call Unknown state=1)
if (state == 1) {
    output "<two "
} else {
    output "><two "
}
output "a="2"><foo bar="baz">fluff</foo><foo
bar="baz">fluff</foo></two>"
state = 1;
```

The straightforward deforestation and partial deforestation of the ALC enables other well-known functional optimizations in order to precompute exactly the parts of the output of the XML processing which could be known at compile time, while leaving the other parts uncalculated until runtime. For example, it is unknown what exactly to do with the "one" begin tag. Then, a large segment of the output is precomputed. Then, given the opaque "Unknown" call, it is unknown what to do for it or after it for the "two" begin tag, but then the rest of the output is precomputed.

In contrast, if the serializer had been written using a more general construct, such as a fold construct from ML or Lisp, the compiler would have to do more complex data flow analysis to determine that the second event and on would result in deterministic output. Obviously, if it was written in an imperative style, with state, then this analysis would be even more difficult.

One of the keys to this optimization is partial automaton deforestation, which is accomplished using the act of splitting one ALC which has an initial state, into repeatedly executing a similar automaton that takes as an input argument its initial state and returns its final state. For example, consider any general ALC:

ALC(initial-state=i, transitions=t, input=x)

For 'partially deforested automaton', a generic version of this ALC can be written as:

Generic(state-arg, input-arg)=ALC(initial-state=state-arg, transitions=t, input=input-arg), and after the sequence of input is exhausted, it returns the then current state.

A call to the ALC can be rewritten as a call to the generic version with passing the ALC's initial state to it, and ignoring the result state:

junk=Generic(i, x)

This has the exact same behavior as the initial ALC did, and thus this process can be accomplished for rewriting any ALC. This is then useful for "splitting up" the ALC, as can be seen in the examples above where as much as possible was precomputed and the "Generic ALC"s were left to compute the rest at runtime. As an illustrative example, consider the sequence case which is in FIG. 1:

ALC(initial-state=i, transitions=t, input=sequence(a,b, c, . . . , z))

can be rewritten as:

Generic(transitions=t) called on i and sequence(a,b,c, . . . , z)

Which, using the rewrite for sequence given in FIG. 1, can be rewritten as:

ia=i
ib=Generic(transitions=t) called on ia and a
ic=Generic(transitions=t) called on ib and b
id=Generic(transitions=t) called on ic and c
. . .
ifinal=Generic(transitions=t) called on iz and z
junk=ifinal After this rewrite, or any other rewrite or "splitting up", we can continue this recursive process by repeatedly rewriting each ALC (Generic) in turn, using each input (a, b, c, . . . z, respectively, in the example). Whatever is precomputable at compile time will be precomputed, thus removing the need for extra objects and conversion passes at runtime. This can dramatically improve the performance of XML processing, as an example, and many kinds of computer processing, in general.

These analyses can lead to precomputation of much of the output, based on just the operations, even before any input is seen. However, these optimizations come at a cost: All main parts of the computation must be functional, and must be easy to deforest against. In particular, for XML processing, all data goes through the XML serializer before output, and to get these benefits the serializer must be functional and easy to deforest against.

Most XML processing today is implemented in imperative C or Java programs, and their serializers are imperative, and thus not at all amenable to straightforward partial evaluation or deforestation. Other current alternatives use functional languages, which are amenable to classical functional language analysis and optimizations in general. Unfortunately, these serializers use constructs such as folds which, while easier to deal with than imperative code for some partial evaluation, are not at all straightforward to deforest against. Even the conversion to automata and then deforesting them to produce a single automata, produces a final automata that will not be straightforward to deforest, and is not easy to partially deforest. Thus, no current solutions can be compiled to eliminate all the recodings for compile-time-computable parts of the output, and highly-optimized processing for the unknown parts. By contrast, partial deforestation and implementation of key parts of a program with our limited automata, while easy to understand and program, can dramatically improve performance of many enterprise applications and XML processing performance as one particular example.

Figure 2A:
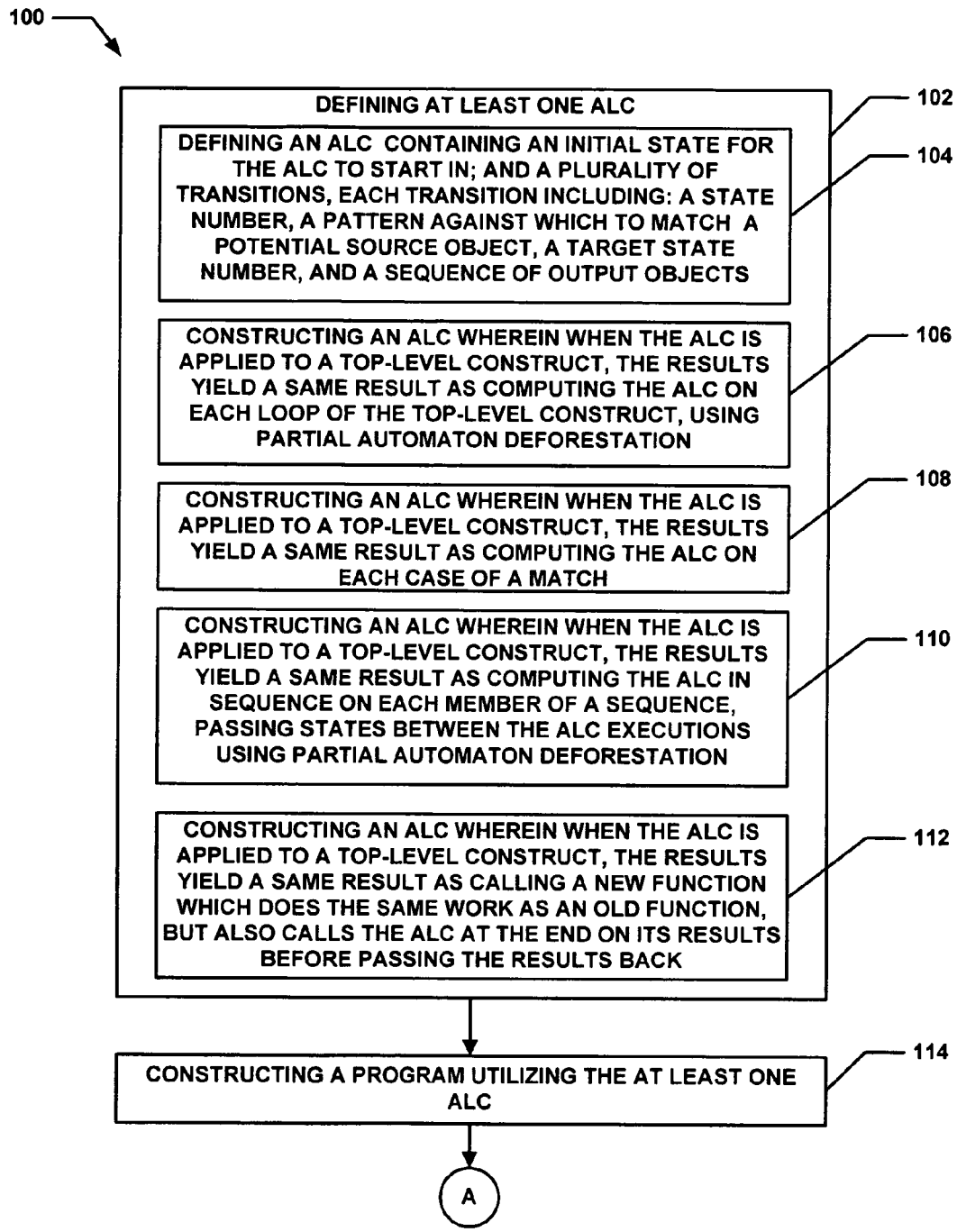
FIGS. 2A and 2B depicts flow diagrams of a method for performing program optimization using Automaton Loop Construct (ALC) in accordance with embodiments of the invention.
Figure 2B:
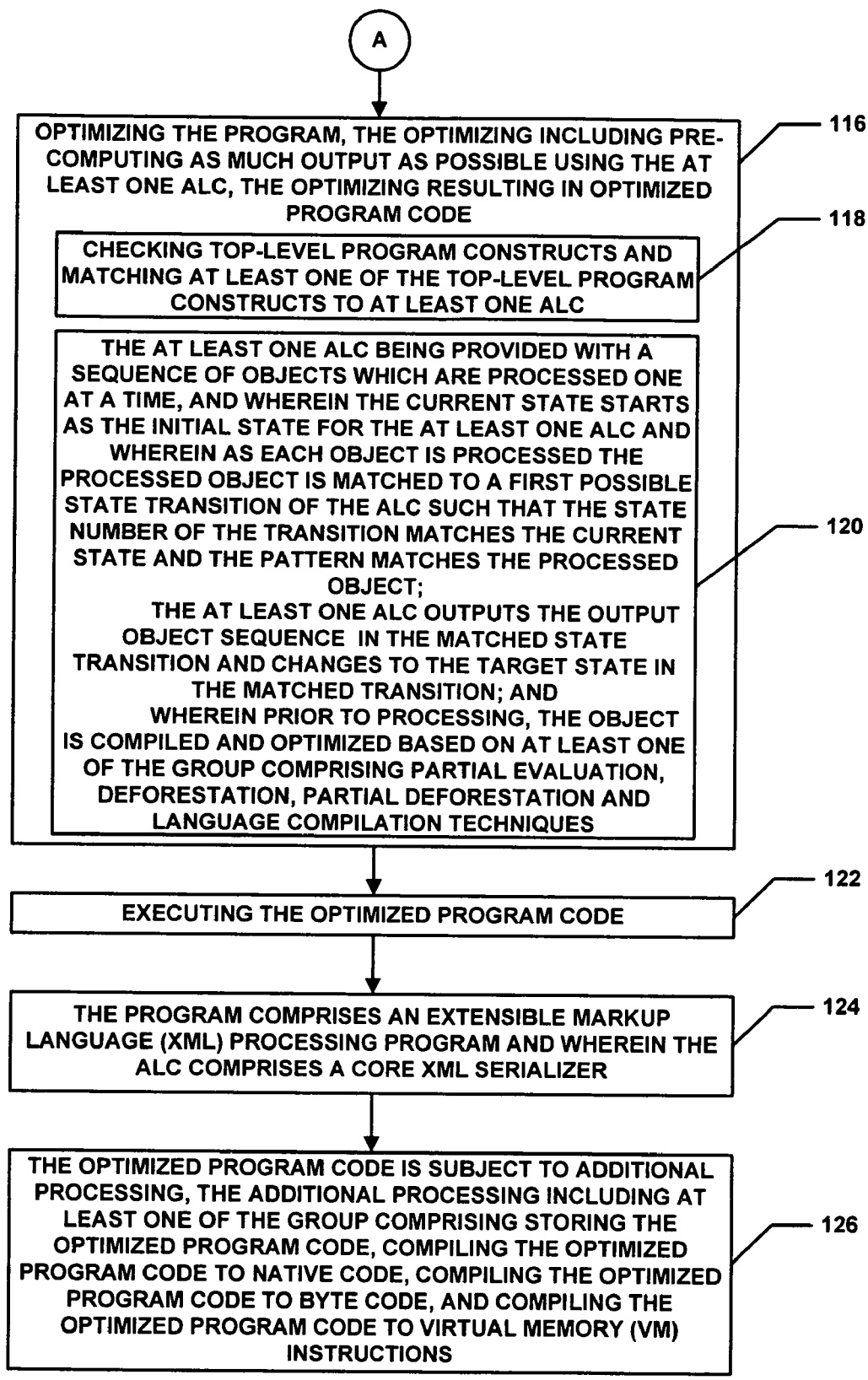

A flow chart of the presently disclosed method is depicted in FIGS. 1 and 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 1 part of the process of deforesting an ALC is shown. The source sequence of objects coming into the ALC could be coming from any general program code. This figure considers the cases where the top-level program constructs being passed as the source of the ALC are checked in step 10, and found to be a for each (step 12), a match (step 14), a sequence (step 16), and a function call (step 18). This certainly does not mean that these four program constructs are the only ones which we can easily and straightforwardly deforest an ALC when its source comes from them. Rather, these four examples should show the technique enough that someone skilled in the art should be able to understand in general how to deforest an ALC whose source comes from any functional language construct. Furthermore, it should be obvious that after one of these optimizations has been accomplished, the process can be repeated as many times as needed in order to optimize and precompute more and more of the program results. In FIG. 1, at processing block 12, the for each is rewritten by realizing that the automaton applied to the results of the for each will yield the same results as computing a slightly-modified for each that applies the partially-deforested automaton to the body of the for each and passes the state of the automaton from each loop iteration to the next loop iteration.

In processing block 14, the match is rewritten by realizing that the automaton applied to the results of the match will yield the same results as computing the automaton on each case of the match. This would be the same for any conditional.

In processing block 16, the sequence is rewritten by realizing that the automaton applied to the sequence will yield the same results as computing the automaton in sequence on each member of the sequence, passing states between the automaton executions using partial automaton deforestation.

In processing block 18, the function call is rewritten by realizing that the automaton applied to the results of the function call will yield the same results as calling a new function which does the same work as the old function, but also calls the ALC at the end on its results before passing them back.

Referring now to FIG. 2A, a method 100 of performing program optimization using Automaton Loop Construct (ALC) is shown. The method begins with processing block 102 which discloses defining at least one ALC. As recited in processing block 104 the ALC includes an initial state for the ALC to start in, and a plurality of transitions, each transition including: a state number, a pattern against which to match a potential source object, a target state number, and a sequence of output objects. The ALCs may be further defined as recited in processing blocks 106, 108, 110, and 112. Processing block 106 discloses defining an ALC comprises constructing an ALC wherein when the ALC is applied to a top-level construct, the results yield a same result as computing the ALC on each loop of the top-level construct, using partial automaton deforestation. Processing block 108 states defining an ALC comprises constructing an ALC wherein when the ALC is applied to a top-level construct, the results yield a same result as computing the ALC on each case of a match. Processing block 110 recites defining an ALC comprises constructing an ALC wherein when the ALC is applied to a top-level construct, the results yield a same result as computing the ALC in sequence on each member of a sequence, passing states between the ALC executions using partial automaton deforestation. Processing block 112 discloses defining an ALC comprises constructing an ALC wherein when the ALC is applied to a top-level construct, the results yield a same result as calling a new function which does the same work as an old function, but also calls the ALC at the end on its results before passing the results back. Processing continues with processing block 114 which states constructing a program utilizing the at least one ALC.

Processing block 116 recites optimizing the program, the optimizing including pre-computing as much output as possible using the at least one ALC, the optimizing resulting in optimized program code. Processing block 118 discloses that the optimizing comprises checking top-level program constructs and matching at least one of the top-level program constructs to at least one ALC. Processing block 120 states optimizing the program includes the at least one ALC being provided with a sequence of objects which are processed one at a time, and wherein the current state starts as the initial state for the at least one ALC and wherein as each object is processed the processed object is matched to a first possible state transition of the ALC such that the state number of the transition matches the current state and the pattern matches the processed object, the at least one ALC outputs the output object sequence in the matched state transition and changes to the target state in the matched transition, and wherein prior to processing, the object is compiled and optimized based on at least one of the group comprising partial evaluation, deforestation, partial deforestation and language compilation techniques.

Processing block 122 recites comprising executing the optimized program code. In a particular embodiment, as recited in processing block 124 the program comprises an extensible markup language (XML) processing program and wherein the ALC comprises a core XML serializer.

Processing block 126 discloses the optimized program code is subject to additional processing, the additional processing including at least one of the group comprising storing the optimized program code, compiling the optimized program code to native code, compiling the optimized program code to byte code, and compiling the optimized program code to Virtual Memory (VM) instructions.

By way of the above described ALC and method of performing program optimization using Automaton Loop Construct (ALC), instead of construction programs as they are today, mostly functional programs are constructed including the new ALC constructs in key places. A compiler partially evaluates the entire programs, where possible, deforests as much as possible, including all of the techniques that have been described to precompute as much of the output as possible. The resulting code is executed, in any form that code can be executed in, including the ALCs. There is less reformulating of data, and less processing, and thus the program runs much faster and use less memory.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A computer implemented method of performing program optimization using Automaton Loop Construct (ALC), the method comprising:
defining at least one ALC, the ALC comprising:
an initial state for the ALC to start in; and
a plurality of transitions, each transition including: a state number, a pattern against which to match a potential source object, a target state number, and a sequence of output objects;
constructing a program utilizing the at least one ALC; and
optimizing the program, the optimizing including pre-computing output using said at least one ALC, the optimizing resulting in optimized program code.

2. The method of claim 1 further comprising executing said optimized program code.

3. The method of claim 1 wherein said optimizing comprises checking top-level program constructs and matching at least one of said top-level program constructs to at least one ALC.

4. The method of claim 1 wherein said optimizing the program includes said at least one ALC being provided with a sequence of objects which are processed one at a time, and wherein the current state starts as the initial state for said at least one ALC and wherein as each object is processed the processed object is matched to a first possible state transition of the ALC such that the state number of the transition matches the current state and the pattern matches the processed object;
the at least one ALC outputs the output object sequence in the matched state transition and changes to the target state in the matched transition; and
wherein prior to processing, said object is compiled and optimized based on at least one of the group comprising partial evaluation, deforestation, partial deforestation and language compilation techniques.

5. The method of claim 1 wherein said defining an ALC comprises one of the group consisting of:
constructing an ALC wherein when said ALC is applied to a top-level construct, the results yield a same result as computing the ALC on each loop of the top-level construct, using partial automaton deforestation;
constructing an ALC wherein when said ALC is applied to a top-level construct, the results yield a same result as computing the ALC on each case of a match;
constructing an ALC wherein when said ALC is applied to a top-level construct, the results yield a same result as computing the ALC in sequence on each member of a sequence, passing states between the ALC executions using partial automaton deforestation; and
constructing an ALC wherein when said ALC is applied to a top-level construct, the results yield a same result as calling a new function which does the same work as an old function, but also calls the ALC at the end on its results before passing the results back.

6. The method of claim 1 wherein said program comprises an extensible markup language (XML) processing program and wherein said ALC comprises a core XML serializer.

7. The method of claim 1 wherein the optimized program code is subject to additional processing, the additional processing including at least one of the group comprising storing the optimized program code, compiling the optimized program code to native code, compiling the optimized program code to byte code, and compiling the optimized program code to Virtual Memory (VM) instructions.

8. A computer readable storage medium having computer readable code thereon for performing program optimization using Automaton Loop Construct (ALC), the medium comprising:
instructions for defining at least one ALC, the ALC including:
an initial state for the ALC to start in; and
a plurality of transitions, each transition including: a state number, a pattern against which to match a potential source object, a target state number, and a sequence of output objects;
instructions for constructing a program utilizing the at least one ALC; and
instructions for optimizing the program, the optimizing including pre-computing output using said at least one ALC, the optimizing resulting in optimized program code.

9. The computer readable storage medium of claim 8 further comprising instructions for executing said optimized program code.

10. The computer readable storage medium of claim 8 wherein said instructions for optimizing comprises instructions for checking top-level program constructs and matching at least one of said top-level program constructs to at least one ALC.

11. The computer readable storage medium of claim 8 wherein said instructions for optimizing the program includes instructions for said at least one ALC being provided with a sequence of objects which are processed one at a time, and wherein the current state starts as the initial state for said at least one ALC and wherein as each object is processed the processed object is matched to a first possible state transition of the ALC such that the state number of the transition matches the current state and the pattern matches the processed object;
the at least one ALC outputs the output object sequence in the matched state transition and changes to the target state in the matched transition; and
wherein prior to processing, said object is compiled and optimized based on at least one of the group comprising partial evaluation, deforestation, partial deforestation and language compilation techniques.

12. The computer readable storage medium of claim 8 wherein said instructions for defining an ALC comprises instructions for one of the group consisting of:
instructions for constructing an ALC wherein when said ALC is applied to a top-level construct, the results yield a same result as computing the ALC on each loop of the top-level construct, using partial automaton deforestation;
instructions for constructing an ALC wherein when said ALC is applied to a top-level construct, the results yield a same result as computing the ALC on each case of a match;
instructions for constructing an ALC wherein when said ALC is applied to a top-level construct, the results yield a same result as computing the ALC in sequence on each member of a sequence, passing states between the ALC executions using partial automaton deforestation; and
instructions for constructing an ALC wherein when said ALC is applied to a top-level construct, the results yield a same result as calling a new function which does the same work as an old function, but also calls the ALC at the end on its results before passing the results back.

13. The computer readable storage medium of claim 8 further comprising instructions wherein said program comprises an extensible markup language (XML) processing program and wherein said ALC comprises a core XML serializer.

14. The computer readable storage medium of claim 8 further comprising instructions wherein the optimized program code is subject to additional processing, the additional processing including at least one of the group comprising storing the optimized program code, compiling the optimized program code to native code, compiling the optimized program code to byte code, and compiling the optimized program code to Virtual Memory (VM) instructions.

15. A computer implemented method of performing program optimization using Automaton Loop Construct (ALC), the method comprising:
    defining at least one ALC, the ALC comprising:
        an initial state for the ALC to start in; and
        a plurality of transitions, each transition including: a state number, a pattern against which to match a potential source object, a target state number, and a sequence of output objects;
    constructing a program utilizing the at least one ALC; and
    checking top-level program constructs and matching at least one of said top-level program constructs to at least one ALC; and
    optimizing the program, the optimizing including pre-computing output using said at least one ALC, the optimizing resulting in optimized program code.

16. The method of claim 15, wherein said program comprises an extensible markup language (XML) processing program and wherein said ALC comprises a core XML serializer.

17. The method of claim 15, wherein constructing a program utilizing the at least one ALC comprises using partial automaton deforestation.

* * * * *